(12) United States Patent
Chen

(10) Patent No.: US 7,182,459 B1
(45) Date of Patent: Feb. 27, 2007

(54) EYEGLASSES WITH ATTACHABLE DIGITAL AUDIO PLAYER

(75) Inventor: Cheng-Chi Chen, Yung Kang (TW)

(73) Assignee: Nan Fu Optical Co., Ltd., Yung Kang (TW)

( * ) Notice: Subject to any disclaimer, the term of this patent is extended or adjusted under 35 U.S.C. 154(b) by 0 days.

(21) Appl. No.: 11/420,992

(22) Filed: May 30, 2006

(51) Int. Cl.
*G02C 1/00* (2006.01)
(52) U.S. Cl. ...................... 351/158; 381/381
(58) Field of Classification Search ............ 351/41, 351/111, 158; 381/381
See application file for complete search history.

(56) References Cited

U.S. PATENT DOCUMENTS 5,335,285 A * 8/1994 Gluz ................... 381/381

2006/0290879 A1 * 12/2006 Mah ..................... 351/41

* cited by examiner

*Primary Examiner*—Huy Mai
(74) *Attorney, Agent, or Firm*—Alan D. Kamrath; Nikolai & Mersereau, P.A.

(57) ABSTRACT

Eyeglasses with attachable digital audio player comprise a pair of eyeglasses having a pair of temples and a digital audio player (DAP). Each temple of the eyeglasses includes a plurality of sets of cross-shaped apertures and accommodating holes in communication with the cross-shaped apertures. The digital audio player comprises two halves, each having a plate, a plurality of projections protruded from an inner surface of each of the plates pass through the cross-shaped apertures and are received in the accommodating holes of the temples, and an outer surface of each of the plates is combined with each half of the digital audio player. The digital audio player is detachable from the eyeglasses and operates independently.

2 Claims, 4 Drawing Sheets

EYEGLASSES WITH ATTACHABLE DIGITAL AUDIO PLAYER

BACKGROUND OF THE INVENTION

1. Field of Invention

The present invention relates to eyeglasses and more particularly to such a pair of eyeglasses (e.g., sunglasses) adapted to releasably attach to a digital audio player (DAP) also known as MP3 player which can operate independently after assembly after detaching from the eyeglasses.

2. Related Art

A type of eyeglasses (e.g., sunglasses) having a DAP (e.g., MP3 player) integrally formed on its temples is commercially available. Such type of eyeglasses has had market acceptance due to its convenience in use.

However, a wearer may have to buy another pair of eyeglasses to wear if he or she does not want the MP3 player temporarily because the MP3 player is integrally formed therewith. This inevitably is not cost effective. Thus, it is desirable to provide a novel pair of eyeglasses having an attachable DAP in order to overcome the inadequacy of the prior art and contribute significantly to the advancement of the art.

SUMMARY OF THE INVENTION

It is therefore an object of the present invention to provide a pair of eyeglasses adapted to releasably attach to a DAP (e.g., MP3 player) which also can be operated independently after assembly after detaching from the eyeglasses.

To achieve the above and other objects, the present invention provides eyeglasses with attachable digital audio player comprising a pair of eyeglasses having a pair of temples and a digital audio player (DAP), wherein each temple of the eyeglasses includes a plurality of sets of cross-shaped apertures and accommodating holes in communication with the cross-shaped apertures, the digital audio player comprises two halves, each having a plate, a plurality of projections protruded from an inner surface of each of the plates pass through the cross-shaped apertures and are received in the accommodating holes of the temples, and an outer surface of each of the plates is combined with each half of the digital audio player so that the pair of eyeglasses are provided with the detachable digital audio player.

To achieve the above and other objects, the present invention further provides each half of a digital audio player having a plurality of projections and a plurality of sets of cross-shaped apertures and accommodating holes corresponding to the projections so as to be combined together to operate independently when the halves of the digital audio player are detached from the temples of the eyeglasses.

The above and other objects, features and advantages of the present invention will become apparent from the following detailed description taken with the accompanying drawings.

DETAILED DESCRIPTION OF THE INVENTION

Figure 1:
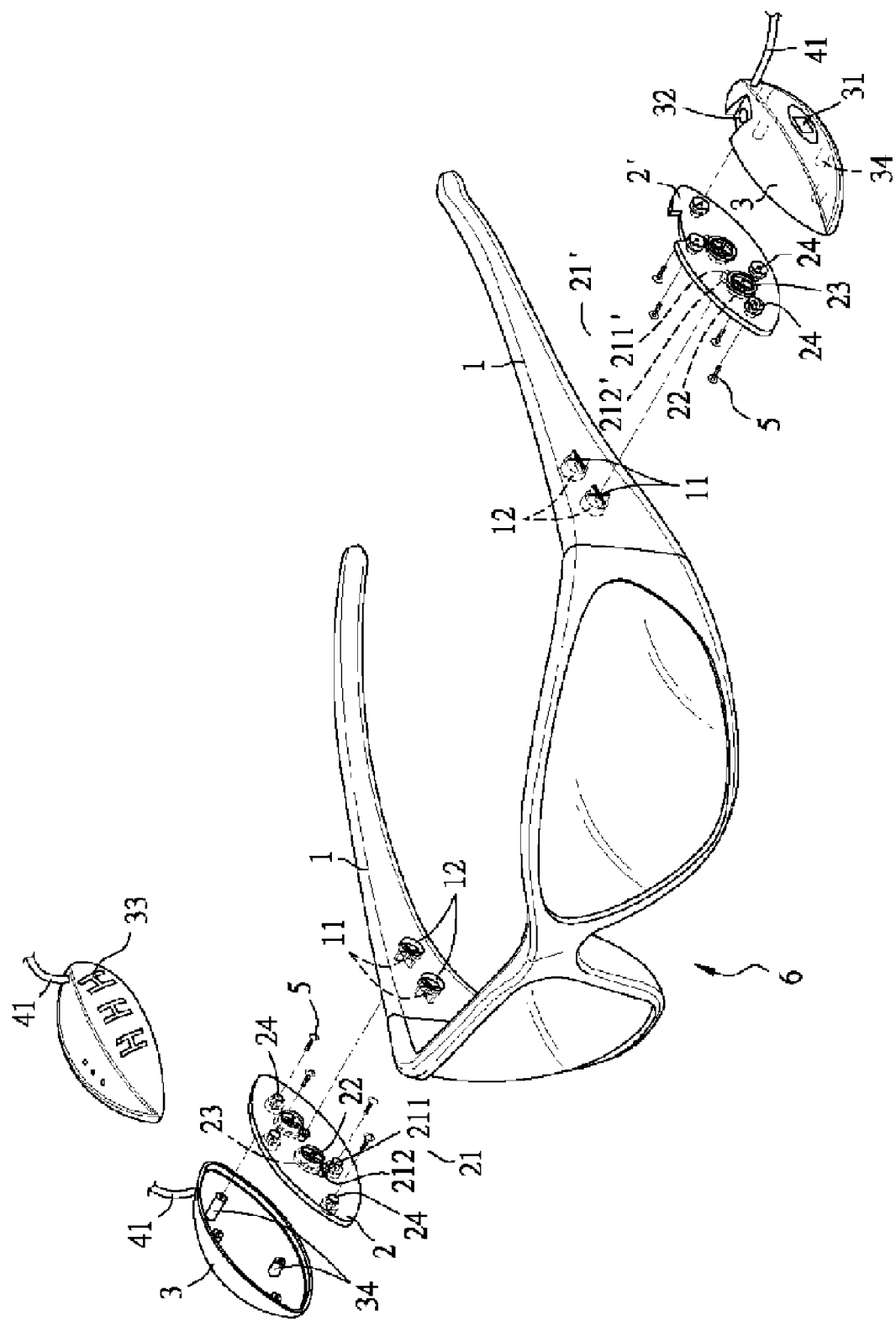
FIG. 1 is an exploded perspective view of a preferred embodiment of eyeglasses having an attachable MP3 player according to the invention.

Referring to FIGS. 1 to 4, a preferred embodiment of the invention is shown. The preferred embodiment comprises a pair of eyeglasses 6, a right and left plates 2 and 2', and a DAP (e.g., MP3 player). Each component is discussed in detailed below.

The eyeglasses 6 comprise a pair of temples 1 formed of soft plastic. Each temple 1 comprises more than one sets of cross-shaped apertures 11 and a circular accommodating holes 12. Each of the apertures 11 is in communication with the accommodating hole 12 of the same set.

Each of the right and left plates 2 and 2' formed of hard plastic comprises more than one projections 21 and 21', more than one sets of cross-shaped apertures 22 and circular accommodating holes 23, and a plurality of through holes 24 on the periphery. Each of the cross-shaped apertures 22 is in communication with the accommodating hole 23 of the same set. Each of the projections 21 and 21' respectively comprises a bar 211 or 211' for passing through the cross-shaped aperture 11 and an enlarged head 212 or 212' for being received in the accommodating hole 12.

The MP3 player 3 comprises two halves. One half of the MP3 player 3 comprises a switch 31 and a DC jack 32 on its outer surface. The other half of the MP3 player 3 comprises a plurality of function keys 33 provided on its outer surface. Further, each half of the MP3 player 3 includes two stubs 34 on the periphery related to the through holes 24 of the plates 2 and 2', and a cable 41 extending therefrom to connect to speakers 4.

Figure 2:
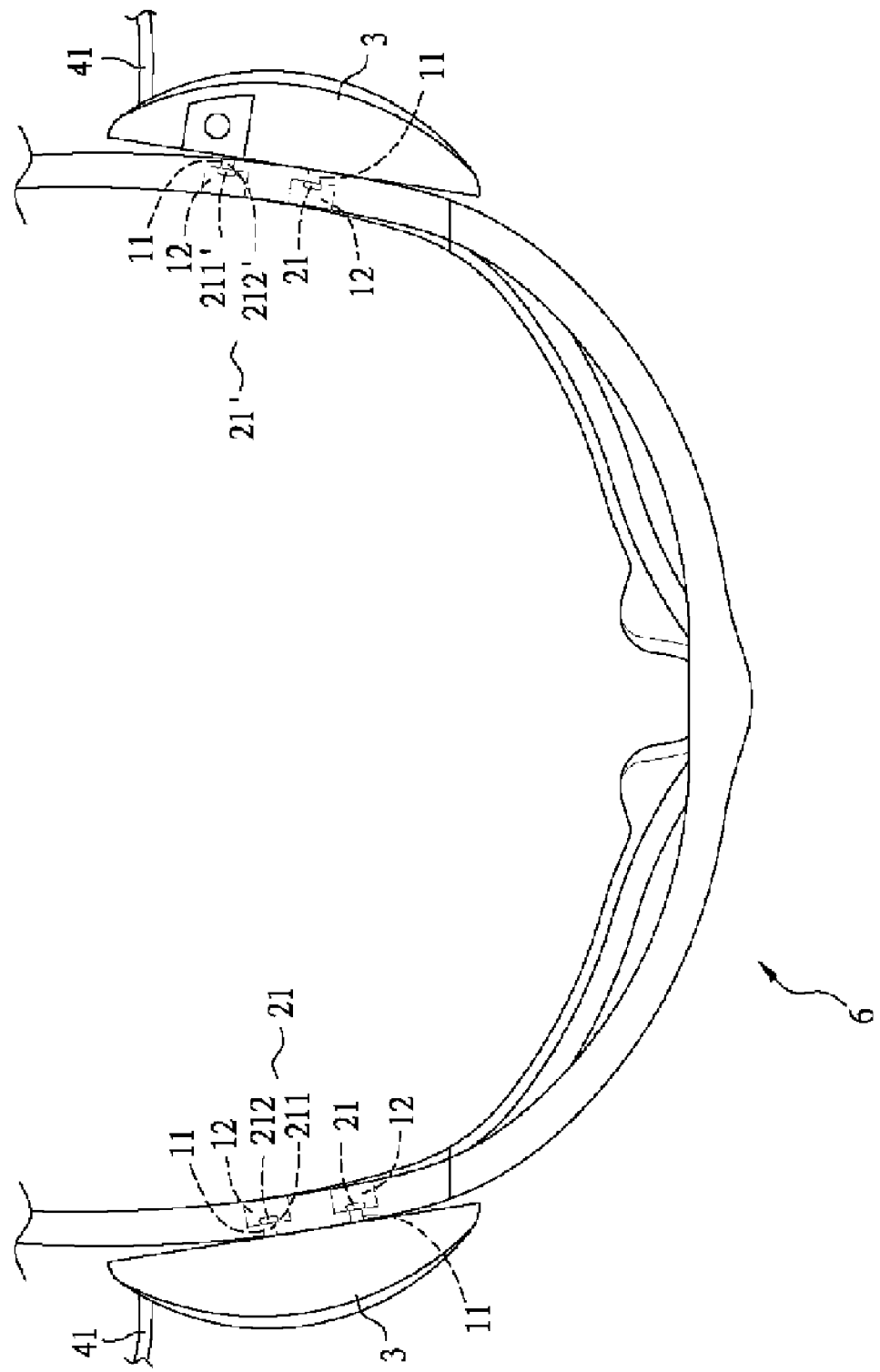
FIG. 2 is a top plan view of the assembled eyeglasses and MP3 player.
Figure 3:
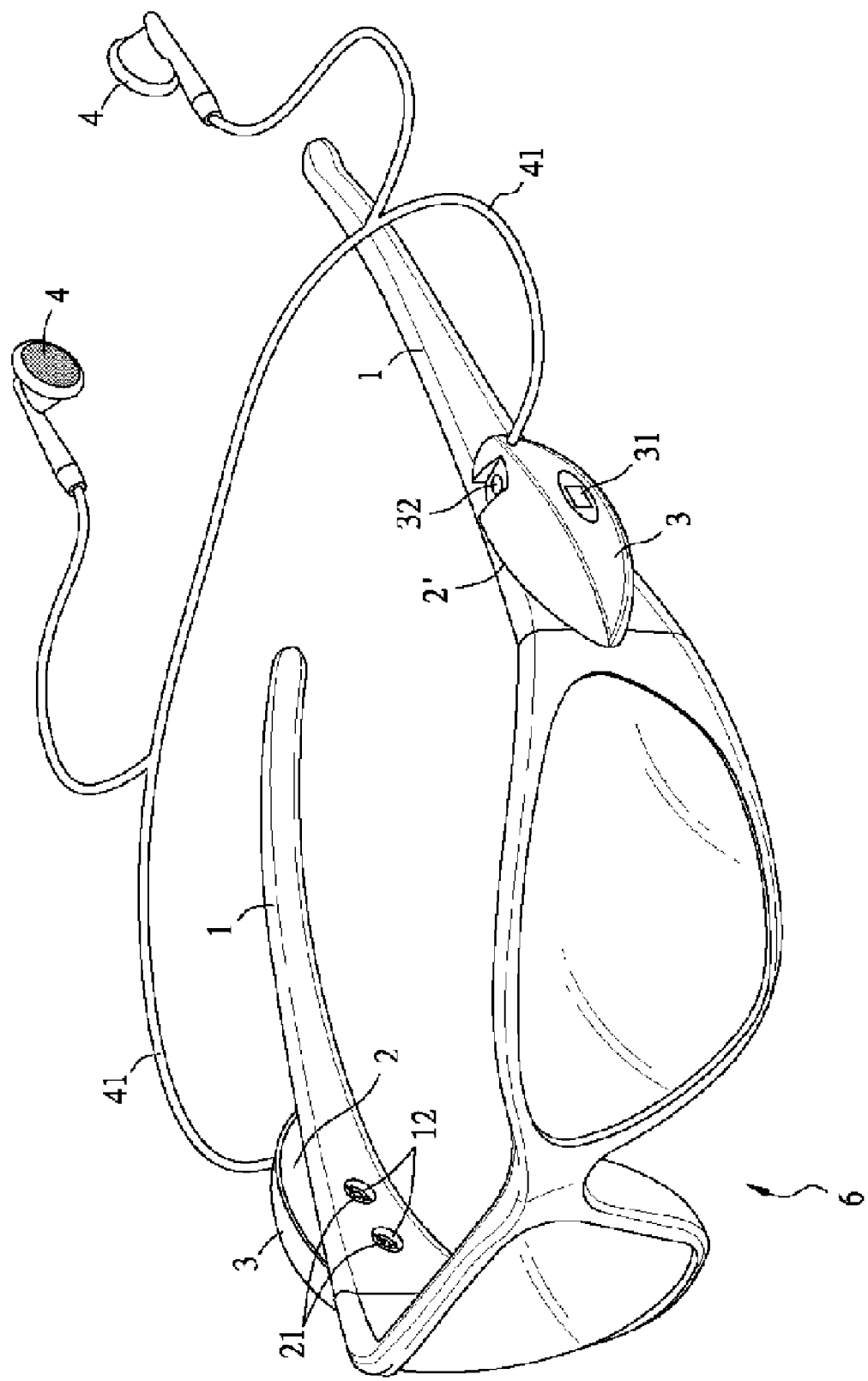
FIG. 3 is a perspective view of the assembled eyeglasses and MP3 player.

An assembly of the MP3 player 3 and the eyeglasses 6 according to the invention will be described in detailed below by referring to FIGS. 2 and 3 in conjunction with FIG. 1. A plurality of screws 5 is screwed through the through holes 24 into the stubs 34 for fastening the plates 2 and 2' and the halves of the MP3 player 3 together. The projections 21, 21' are then inserted into the corresponding sets of cross-shaped apertures 11 and accommodating holes 12 until the heads 212, 212' are fastened in the accommodating holes 12 with the bars 211, 211' tightly received in the cross-shaped apertures 11. As an end, the MP3 player 3 and the eyeglasses 6 are assembled rapidly. Thus, a user may listen to music by playing the MP3 player 3 while wearing the eyeglasses 6. It is understood that the user may easily detach the MP3 player 3 from the eyeglasses 6 by removing the projections 21, 21' out of the corresponding sets of cross-shaped aperture 11 and depression 12 by exerting a minimum pulling force since as stated above the plates 2 and 2' are formed of hard plastic and the temples 1 are formed of soft plastic.

Figure 4:
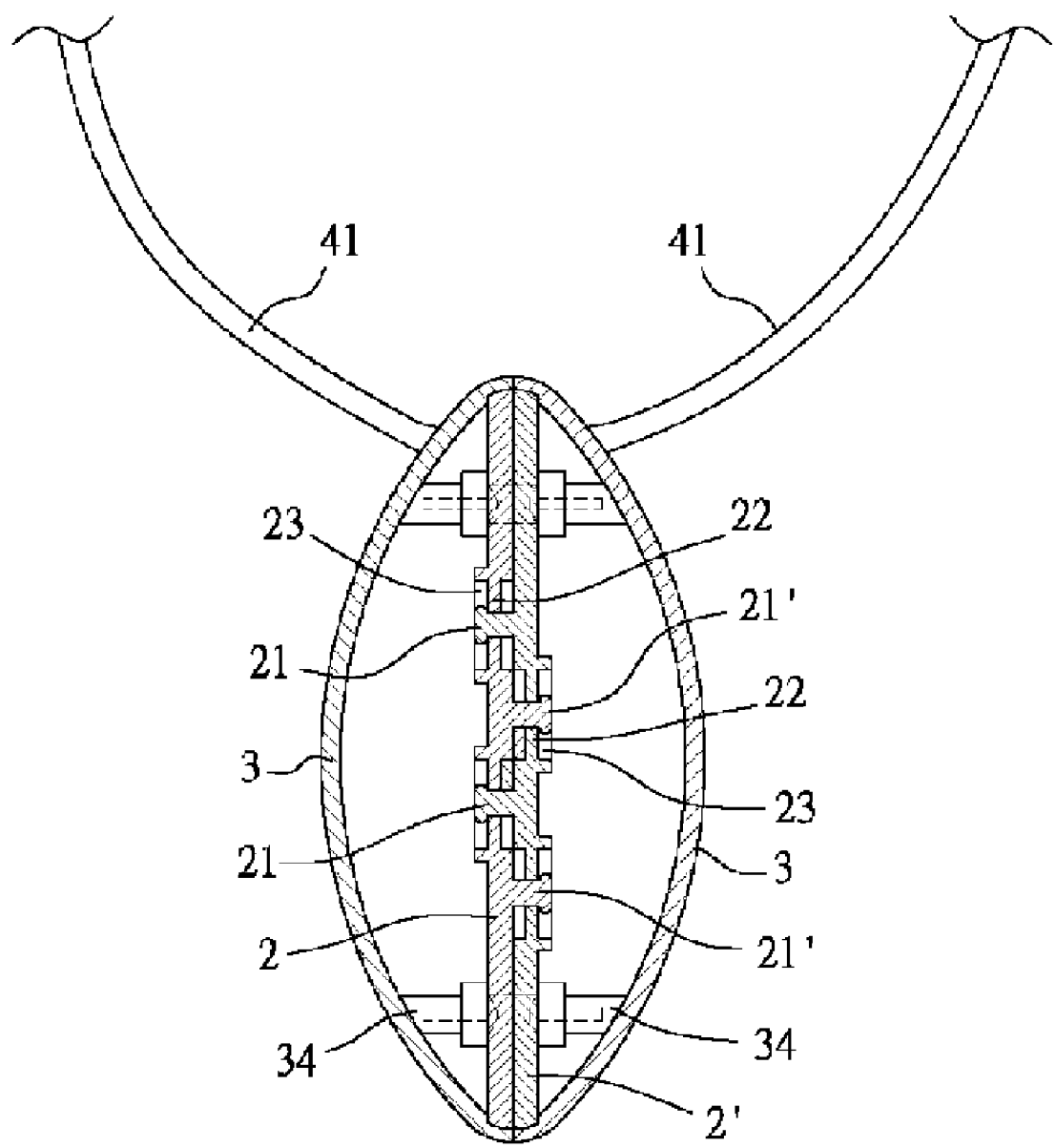
FIG. 4 is a cross-sectional view of the MP3 player assembled as an independent unit after detaching from the eyeglasses.

An assembly of the MP3 player 3 as an independent unit according to the invention will be described in detailed below by referring to FIG. 4 in conjunction with FIG. 1. After detaching from the eyeglasses 6, the projections 21 and 21' of one half of the MP3 player 3 are inserted into the corresponding sets of cross-shaped apertures 22 and accommodating holes 23 of the other half of the MP3 player 3 until the projections 21, 21' are received in the accommodating holes 23 after passing the cross-shaped apertures 22. As an end, the halves of the MP3 player 3 are assembled. Thus, a user may listen to music by playing the MP3 player 3. It is understood that the user may easily detach one half of the MP3 player 3 from the other half of the MP3 player 3 by removing the projections 21, 21' out of the corresponding sets of cross-shaped apertures 22 and accommodating holes 23 by exerting a minimum pulling force.

While the invention herein disclosed has been described by means of specific embodiments, numerous modifications and variations could be made thereto by those skilled in the art without departing from the scope and spirit of the invention set forth in the claims.

What is claimed is:

1. Eyeglasses with attachable digital audio player comprising a pair of eyeglasses having a pair of temples and a digital audio player (DAP), wherein:

each temple of the eyeglasses includes a plurality of sets of cross-shaped apertures and accommodating holes in communication with the cross-shaped apertures, the digital audio player comprises two halves, each having a plate, a plurality of projections protruded from an inner surface of each of the plates pass through the cross-shaped apertures and are received in the accommodating holes of the temples, and an outer surface of each of the plates is combined with each half of the digital audio player so that the pair of eyeglasses are provided with the detachable digital audio player.

2. The eyeglasses with attachable digital audio player of claim 1, wherein each half of the digital audio player has a plurality of projections and a plurality of sets of cross-shaped apertures and accommodating holes corresponding to the projections so as to be combined together to operate independently when the halves of the digital audio player are detached from the temples of the eyeglasses.

* * * * *